(12) United States Patent
Kohler et al.

(10) Patent No.: US 8,958,216 B2
(45) Date of Patent: Feb. 17, 2015

(54) METHOD AND APPARATUS FOR DIGITAL ISOLATION USING PLANAR MAGNETIC CIRCUITS

(71) Applicant: Tyco Electronics Corporation, Berwyn, PA (US)

(72) Inventors: Raymond Howard Kohler, Souderton, PA (US); Stephen Mark Jackson, Mount Joy, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 302 days.

(21) Appl. No.: 13/646,809

(22) Filed: Oct. 8, 2012

(65) Prior Publication Data
US 2014/0098569 A1    Apr. 10, 2014

(51) Int. Cl.
*H02M 3/22* (2006.01)
(52) U.S. Cl.
USPC ............................................. 363/15; 363/17
(58) Field of Classification Search
USPC ........................................ 363/15–17, 98, 132
See application file for complete search history.

(56) References Cited

U.S. PATENT DOCUMENTS

| | | | |
|---|---|---|---|
| 5,844,461 A | 12/1998 | Faulk et al. | |
| 5,995,387 A * | 11/1999 | Takahashi et al. | ......... 363/21.04 |
| 6,870,475 B2 | 3/2005 | Fitch et al. | |
| 7,200,014 B1 * | 4/2007 | Hawkes et al. | ............. 363/21.1 |
| 7,460,002 B2 | 12/2008 | Estrov | |
| 2012/0093039 A1 * | 4/2012 | Rofougaran et al. | ......... 370/278 |
| 2013/0082516 A1 * | 4/2013 | Yamaguchi | ...................... 307/1 |
| 2014/0097691 A1 * | 4/2014 | Jackson et al. | ................. 307/66 |

* cited by examiner

*Primary Examiner* — Jessica Han

(57) ABSTRACT

A digital isolation circuit includes an encode circuit, a planar magnetic circuit, and a decode circuit. The encode circuit receives an input signal and divides the input signal into a first signal pulse and a second signal pulse. The planar magnetic circuit is coupled to an output of the encode circuit. The planar magnetic circuit includes a primary winding, a secondary winding and a magnetic core. The primary winding is magnetically coupled to the secondary winding through the magnetic core to generate an isolated output signal in response to the pair of signal pulses. The decode circuit receives the isolated output signal from the secondary winding to generate an output signal substantially identical to input signal. A method of digitally isolating a square wave input signal from an output signal using the digital isolation circuit is also disclosed.

20 Claims, 5 Drawing Sheets

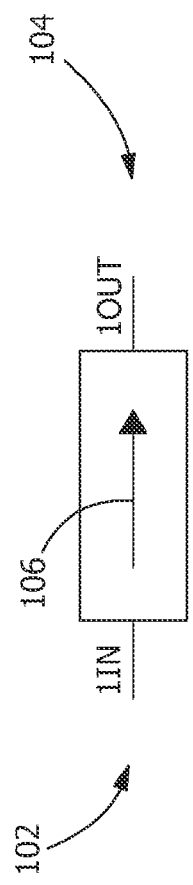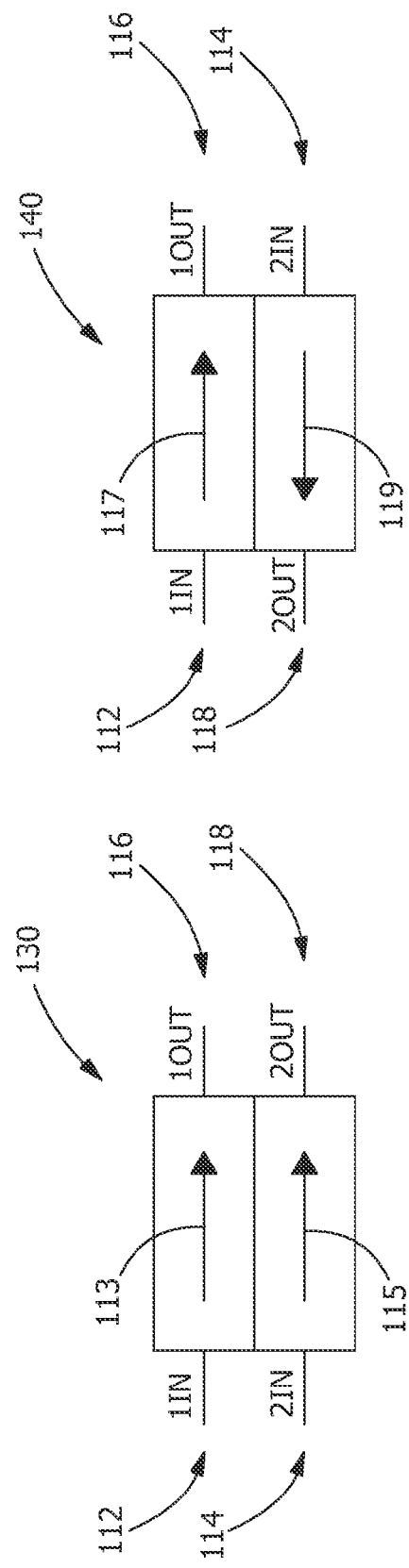
FIG. 5
FIG. 6A
FIG. 6B

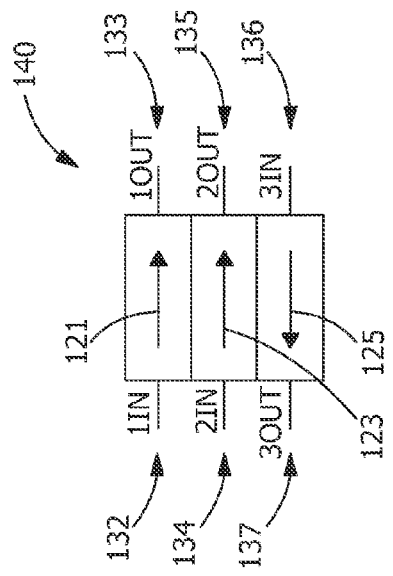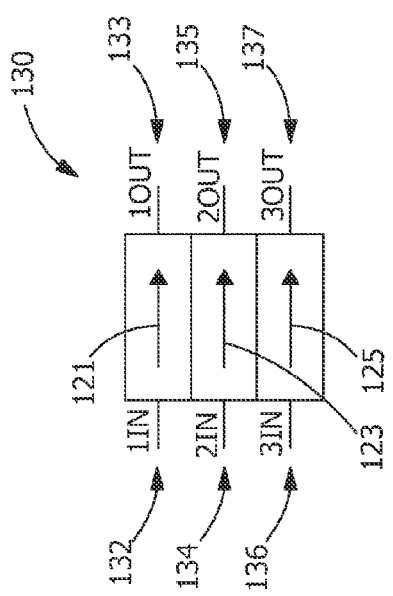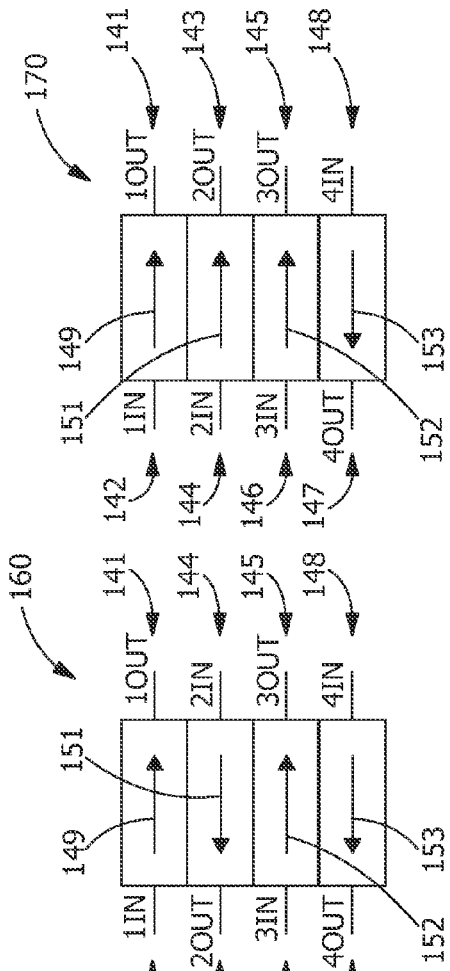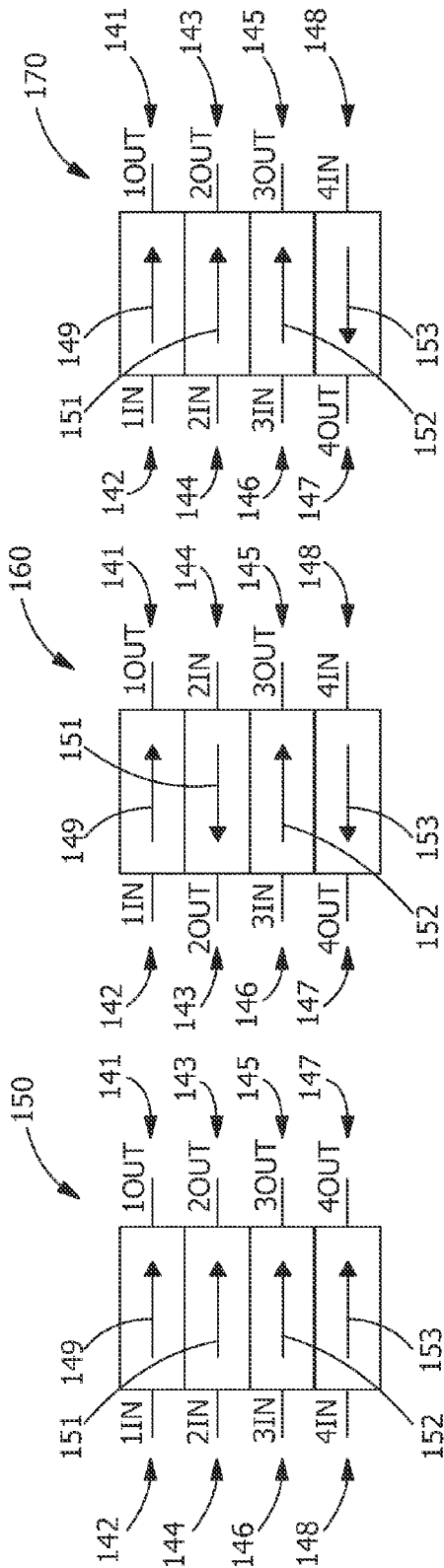

METHOD AND APPARATUS FOR DIGITAL ISOLATION USING PLANAR MAGNETIC CIRCUITS

BACKGROUND

The application generally relates to a digital isolation circuit. The application relates more specifically to a digital isolation circuit in a planar magnetic device.

Digital isolation devices or circuits may be used to prevent current flow between two communication points where there is potential for damage to devices due to current surges or mismatched ground potentials. Digital isolation may be accomplished with existing devices, e.g., optical, inductive or capacitive devices. Components that are currently used in digital isolation circuits are expensive. Further, such components may consume extra area on a Printed Circuit Board (PCB) which may be more useful for other circuitry.

Digital isolation circuits are useful to ensure data transfer without an electrical connection or leakage path that may create a safety hazard or cause damage to more sensitive circuit elements downstream.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

One embodiment relates to a digital isolation circuit. The digital isolation circuit includes an encode circuit, a planar magnetic circuit, and a decode circuit. The encode circuit receives an input signal and divides the input signal into a first signal pulse and a second signal pulse. The planar magnetic circuit is coupled to an output of the encode circuit. The planar magnetic circuit includes a primary winding, a secondary winding and a magnetic core. The primary winding is magnetically coupled to the secondary winding through the magnetic core to generate an isolated output signal in response to the pair of signal pulses. The decode circuit receives the isolated output signal from the secondary winding to generate an output signal substantially identical to input signal.

Another embodiment relates to a method of digitally isolating a square wave input signal from an output signal. The method includes providing a planar magnetic transformer having an encoder circuit at an input terminal and a decoder circuit at an output terminal; dividing the input signal into a first signal pulse and a second signal pulse; generating a first square wave pulse in response to the first signal pulse and a second output square wave pulse in response to the second signal pulse magnetically coupling the first output square wave and the second output square wave to the decoder circuit; transforming the first signal pulse as a positive output pulse and the second signal pulse as a negative output pulse to generate a combined signal; and generating an output signal from the decoder, the output signal substantially identical to input signal.

One advantage the digital isolation circuit provides is the ability to convert an input signal to small pulses to allow the planar magnetic component to be much smaller than comparable conventional devices.

Inductive-based digital isolation is provided using planar magnetic circuit components.

Digital isolation is sometimes required between a product interconnect and microcontroller. The present disclosure provides the ability to produce a digital isolator component or a digital isolated connector or cable.

The digital isolator circuit uses economical planar magnetic and printed circuit board components.

The digital isolator circuit uses ultra-small electronics packaged tightly on a printed circuit board which uses technology. The digital isolator circuit includes embedded inductive-based isolation transformers inside a multi-layer printed circuit board to minimize packaging. Digital isolated connectors or cables can embed the digital isolation circuitry into a product to provide digital isolation and save printed circuit board space by eliminating the need for separate isolation components mounted on the PCB.

Alternative exemplary embodiments relate to other features and combinations of features as may be generally recited in the claims.

BRIEF DESCRIPTION OF THE FIGURES

FIG. 5 shows a configuration for a single channel device.

FIGS. 6A and 6B show various exemplary configuration options for 2-channel devices.

FIGS. 7A and 7B show various exemplary configuration options for 3-channel devices.

FIGS. 8A-8C show various exemplary configuration options for 4-channel devices.

DETAILED DESCRIPTION OF THE EXEMPLARY EMBODIMENTS

Figure 1:
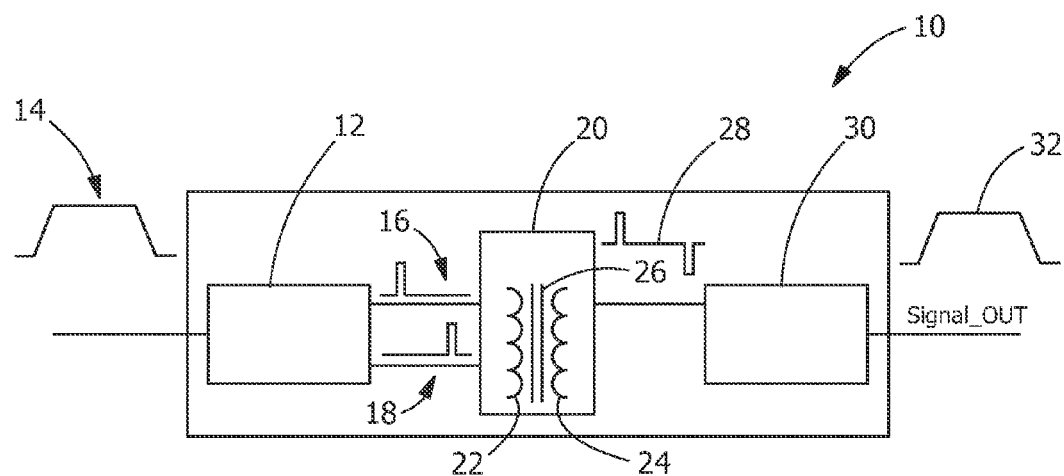
FIG. 1 is a schematic circuit diagram of a digital isolation circuit architecture.

Referring to FIG. 1, a digital isolation circuit 10 is illustrated as a modular building block that can be configured in various ways for specific applications. An encode circuit 12 receives an input signal 14 and divides input signal 14 into two signal pulses 16, 18 at the output of encode circuit 12. The low-to-high leading edge of input signal 14 generates the first or top pulse 16 and the high-to-low trailing edge generates the second or bottom pulse 18. Using this method isolation is independent of input signal speeds.

The output signals 16, 18 of encode circuit 12 are input to the primary winding 22 of a planar magnetic circuit 20. The secondary winding 24 of planar magnetic circuit 20 is coupled to primary winding 22 through core 26 to generate isolated signal 28. Isolated signal 28 of planar magnetic circuit 20 converts the two positive pulses 16, 18 into a positive and a negative pulse. Isolated signal 28 is electrically isolated from primary winding 22 and input signal 14.

A decode circuit 30 receives isolated signal 28 from secondary winding 24 of planar magnetic circuit 20 and reconstructs isolated signal 28 to generate output signal 32. Output signal 32 will be substantially identical to input signal 14 with only a very small propagation delay.

Figure 2:
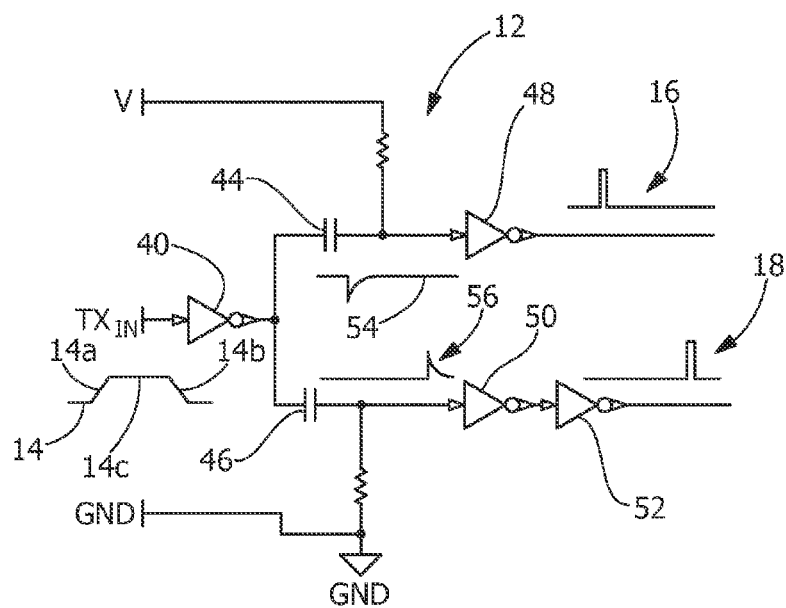
FIG. 2 is a schematic circuit diagram of an exemplary encode circuit for the digital isolation circuit architecture.

Referring next to FIG. 2, an exemplary encode circuit 12 is shown. An input signal 14 is applied to a signal inverter 40 of encode circuit 12. Signal Rx is represented by a digital waveform. Signal inverter 40 output is connected to a pair of parallel capacitors 44, 46. Capacitor 44 and capacitor 46 may have approximately identical capacitance values, e.g., 100 picofarad (pf). Capacitor 44 is responsive to the leading edge 14a of Rx IN 14, and generates a negative decaying impulse waveform 54. Capacitor 46 is response to trailing edge 14b of Rx IN 14, and generates a positive decaying impulse waveform 56. Capacitor 44 is connected on a load side to a signal inverter 48. Signal 54 is input to signal inverter 48, which inverts signal 54 and generates a positive square wave pulse 16 as an output signal. Capacitor 46 is connected on a load side to a pair of inverters 50, 52. Inverters 50, 52 are connected in series between capacitor 46 and planar magnetic circuit or transformer 20. Signal 56 is input to first signal inverter 50, which inverts signal 56 and transmits signal 56 to signal inverter 52. Signal inverter 52 generates a positive output square wave pulse 18 as an output signal. The encode circuit outputs the combination of signals 16 and 18 as two square wave pulses separated by an interval approximately equal to the positive peak 14c of signal 14. In one embodiment signal inverters may be Schmitt inverters/buffers.

Figure 3:
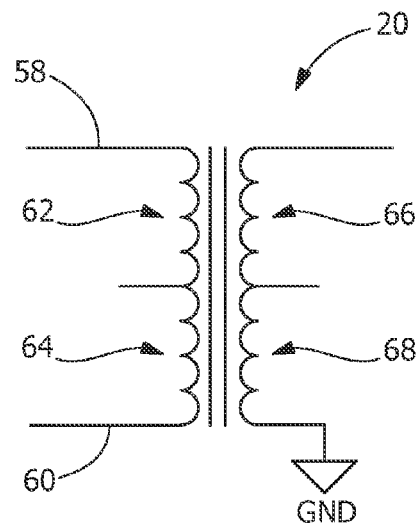
FIG. 3 is a schematic circuit diagram of a planar magnetic transformer for the digital isolation circuit architecture.

Referring next to FIG. 3, an exemplary planar magnetic transformer 20 is shown. Encode circuit 12 is connected at its output to planar magnetic transformer 20. The pair of pulses 16, 18 present at the output of encode circuit 12 are applied to terminals 58 and 60, respectively, at the input to planar magnetic transformer 20. Transformer polarity is indicated by 0 symbols on windings 62, 64, 66, and 68. Planar magnetic transformer 20 transforms pulse 16 as a positive pulse and pulse 18 as a negative pulse, resulting in a combined signal 70 (FIG. 3) at the output of planar magnetic transformer 20.

Figure 4:
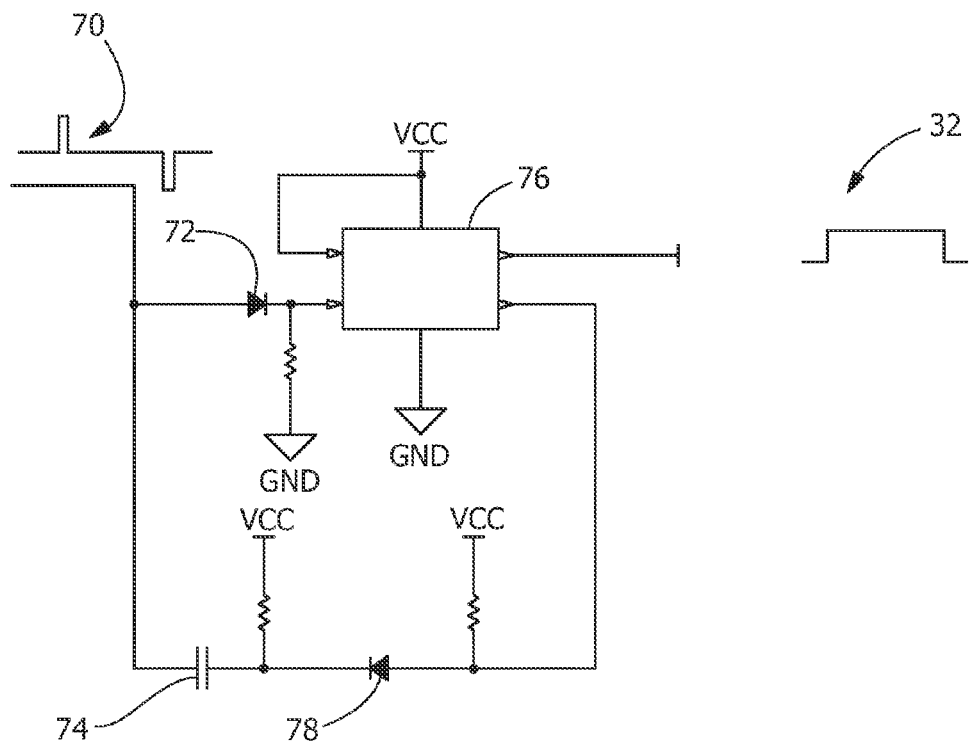
FIG. 4 is a schematic circuit diagram of an exemplary decode circuit for the digital isolation circuit architecture.

Referring next to FIG. 4, an exemplary decode circuit 30 is shown. Signal 70 is applied to the input of decode circuit 30. Decode circuit 30 includes a forward biased diode 72 and a capacitor 74 connected in parallel. Diode 72 is connected to a flip flop 76 at a first input terminal of flip flop 76. In one embodiment flip flop 76 may be a single positive edge-triggered D-type CMOS flip flop. Capacitor 74 is connected with a reverse-biased diode 78 in series with a second input of flip flop 76. The output of flip flop 76 is represented by square-wave signal 32, substantially identical to input signal 14. The output square-wave signal 32 is digitally isolated from input signal 14.

Configuration options for circuit architecture 10 include uni-directional, bi-directional and hybrid options, for single through four channel devices as shown in FIGS. 5-8, described below.

Referring to FIG. 5, a single channel configuration is by definition a uni-directional device, with a single input 102 and a single output 104, with a directional arrow 106 indicating the direction of the signal flow.

Referring to FIGS. 6A and 6B, a 2-channel configuration for the isolation circuit 10 may include a unidirectional configuration 110 (FIG. 6A) and a bi-directional configuration 120 (FIG. 6B). Unidirectional configuration 110 includes two inputs 112, 114 and two outputs 116 and 118. Directional arrows 113, 115 indicate forward flow of signals from inputs 112, 114 and outputs 116 and 118, respectively. Bi-directional configuration 120 shows signal flow in opposite directions as indicated by directional arrows 117, 119.

Referring to FIGS. 7A and 7B, a 3-channel configuration may be shown as one of a unidirectional 3-channel configuration 130 (FIG. 7A) and a hybrid 3-channel configuration 140 (FIG. 7B). Uni-directional 3-channel configuration 130 includes inputs 132, 134, 136, and outputs 133, 135, 137, respectively. Directional arrows 121, 123 and 125 indicate forward flow of signals 132, 134, 136, to outputs 133, 135, 137, respectively. Hybrid 3-channel configuration 140 includes input signals 132 and 134, flowing in a forward direction as indicated by arrows 121, 123 to outputs 133 and 135 respectively, with the flow of input signal 136 to output 137 in a reverse direction as indicated by directional arrows 139, or a hybrid of forward and reverse signal paths.

Referring to FIGS. 8A-8C, 4-channel configurations 150, 160 and 170 may be shown as a unidirectional 4-channel configuration 150 (FIG. 8A), a bidirectional 4-channel configuration 160 (FIG. 8B), and a hybrid 4-channel configuration 170 (FIG. 8C). Uni-directional 4-channel configuration 150 includes inputs 142, 144, 146, and 148; and outputs 141, 143, 145 and 147, respectively. Directional arrows 149, 151, 152 and 153 indicate forward flow of signals 142, 144, 146, 148, to outputs 141, 143, 145, 147, respectively. Bidirectional 4-channel configuration 146 includes input signals 142 and 146, flowing in a forward direction as indicated by directional arrows 149, 152, to outputs 141 and 145 respectively, with the flow of input signals 144, 148 to outputs 143, 147 in a reverse direction as indicated by directional arrows 151, 153. Hybrid 4-channel configuration 170 includes inputs 142, 144, 146, respectively flowing in a forward direction as indicated by directional arrows 149, 151, 152, to outputs 141, 143 and 145 respectively; and input 148 flowing in a reversed direction to output 147, resulting a hybrid configuration of forward and reverse signal paths.

Figure 9:
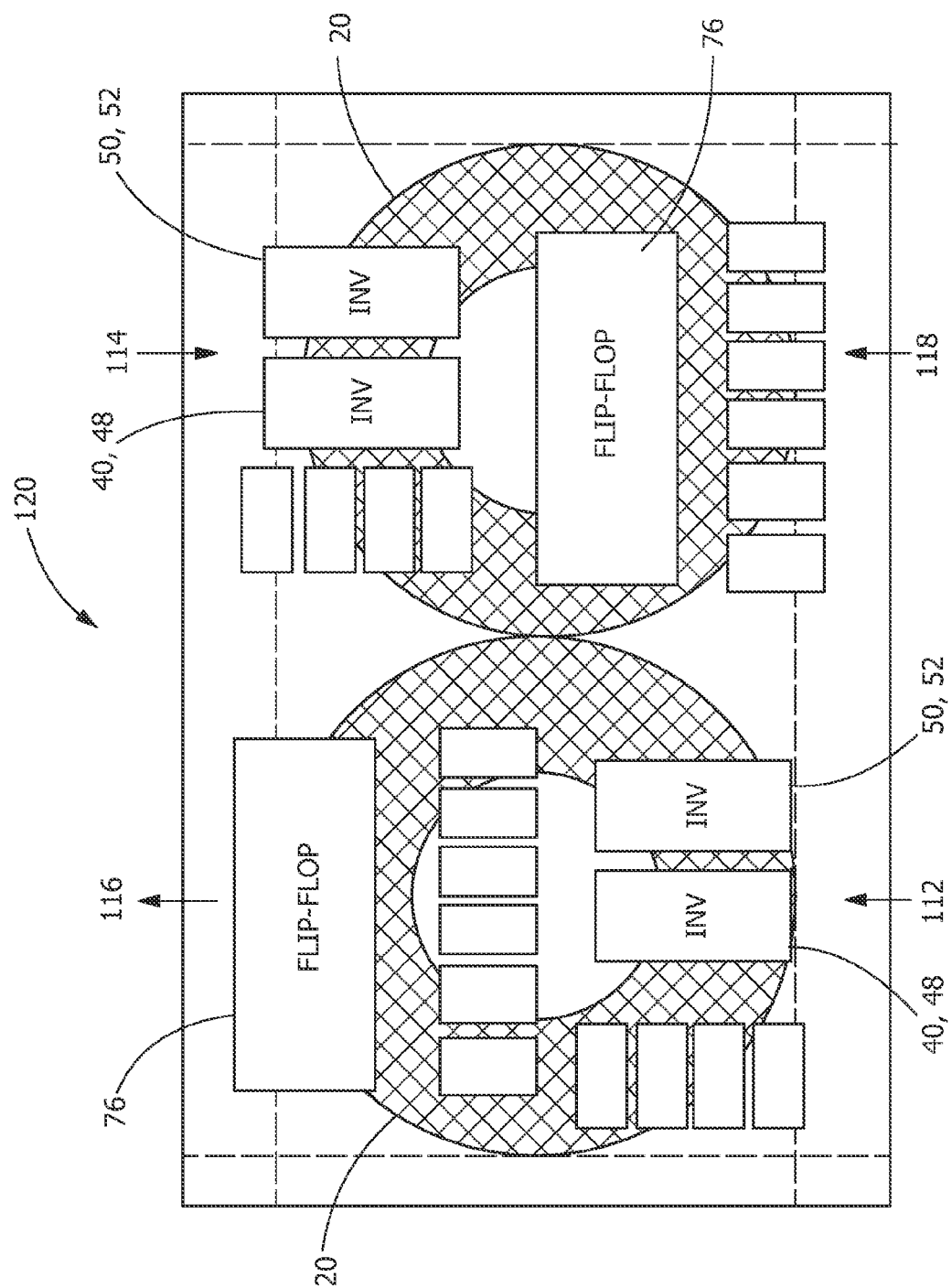
FIG. 9 shows an exemplary digital isolator bi-directional 2-channel device printed circuit board arrangement.

Referring next to FIG. 9, an exemplary digital isolator bi-directional 2-channel device 120 printed circuit board arrangement is shown. Planar magnetic transformers 20 are positioned underneath circuit components, e.g., flip flops 76, and inverters 40, 48, 50, 52. First channel input 112 and second channel input 114 are on opposite sides of device 120, as are first channel output 116 and second channel output 118. Additional circuit components may be included but are not shown in FIG. 9 for clarity.

It should be understood that the application is not limited to the details or methodology set forth in the following description or illustrated in the figures. It should also be understood that the phraseology and terminology employed herein is for the purpose of description only and should not be regarded as limiting.

It is important to note that the construction and arrangement of the planar magnetic digital isolation circuit as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

What is claimed is:

1. A digital isolation circuit comprising
An encode circuit, a planar magnetic transformer, and a decode circuit,
the encode circuit configured to receive an input signal and divide the input signal into a first signal pulse and a second signal pulse;
the planar magnetic circuit coupled to an output of the encode circuit, the planar magnetic circuit comprising:
a primary winding, a secondary winding and a magnetic core,
the primary winding magnetically coupled to the secondary winding through the magnetic core to generate an isolated output signal in response to the pair of signal pulses;
the decode circuit configured to receive the isolated output signal from the secondary winding to generate an output signal substantially identical to input signal.

2. The circuit of claim 1, wherein the encode circuit further comprising: a first signal inverter connected to a first capacitor and a second capacitor, the first capacitor connected to a second signal inverter, the second signal inverter configured to generates a positive square wave pulse in response to the first signal pulse; the second capacitor connected to a second signal inverter and a third signal inverters to generate a positive output square wave pulse in response to the second signal pulse.

3. The circuit of claim 2, wherein the first capacitor generates a negative decaying impulse waveform in response to the leading edge, and the second capacitor generates a positive decaying impulse waveform in response to trailing edge.

4. The circuit of claim 2, further comprising the second signal inverter and the third signal inverters connected in series between the second capacitor and the planar magnetic transformer; and the second signal pulse is input to the second signal inverter, the second signal inverts the second signal pulse and transmits the second signal pulse the third signal inverter.

5. The circuit of claim 4, wherein the first, second and third signal inverters comprise Schmitt inverters.

6. The circuit of claim 1, wherein the planar magnetic transformer is configured to transform the first signal pulse as a positive output pulse and the second signal pulse as a negative output pulse to generate a combined signal.

7. The circuit of claim 1, wherein the decode circuit comprises a forward biased diode connected in parallel with a third capacitor; the diode connected to a flip flop at a first input terminal of the flip flop.

8. The circuit of claim 7, wherein the third capacitor is connected in series with a reverse-biased diode, the reverse-biased diode connected to a flip flop.

9. The circuit of claim 8, wherein an output of the flip flop is substantially identical to the input signal and digitally isolated from the input signal.

10. The circuit of claim 8, wherein the flip flop comprises a single positive edge-triggered D-type CMOS flip flop.

11. The circuit of claim 1, wherein the input signals is a square-wave having a low-to-high leading edge and a high-to-low trailing edge, and the low-to-high leading edge generates the first signal pulse and the high-to-low trailing edge generates the second signal pulse.

12. The circuit of claim 1, wherein the digital isolation circuit comprises a plurality of signal channels, wherein signal flow of the plurality of channel is unidirectional.

13. The circuit of claim 12, wherein the unidirectional digital isolation circuit comprises 2, 3 or 4 channels.

14. The circuit of claim 1, wherein the digital isolation circuit comprises a plurality of signal channels, wherein signal flow of the plurality of channels is bi-directional.

15. The circuit of claim 14, wherein the bidirectional digital isolation circuit comprises 2 or 4 channels.

16. The circuit of claim 1, wherein the digital isolation circuit comprises a plurality of signal channels, wherein signal flow of the plurality of channels is a hybrid of unidirectional and bi-directional.

17. The circuit of claim 16, wherein the hybrid digital isolation circuit comprises 3 or 4 channels.

18. A method of digitally isolating a square wave input signal from an output signal, comprising:
providing a planar magnetic transformer having an encoder circuit at an input terminal and a decoder circuit at an output terminal;
dividing the input signal into a first signal pulse and a second signal pulse;
generating a first square wave pulse in response to the first signal pulse and a second output square wave pulse in response to the second signal pulse
magnetically coupling the first output square wave and the second output square wave to the decoder circuit;
transforming the first signal pulse as a positive output pulse and the second signal pulse as a negative output pulse to generate a combined signal; and
generating an output signal from the decoder, the output signal substantially identical to input signal.

19. The method of claim 18, further comprising the step of: delaying the second square wave pulse relative to the first square wave pulse by an interval in response to a first and second decaying impulse.

20. The method of claim 19, further comprising transforming the first signal pulse as a positive output pulse and the second signal pulse as a negative output pulse to generate a combined signal.

* * * * *